(No Model.)
D. D. TOMPKINS.
SELF OILING PULLEY.
No. 425,272.     Patented Apr. 8, 1890.
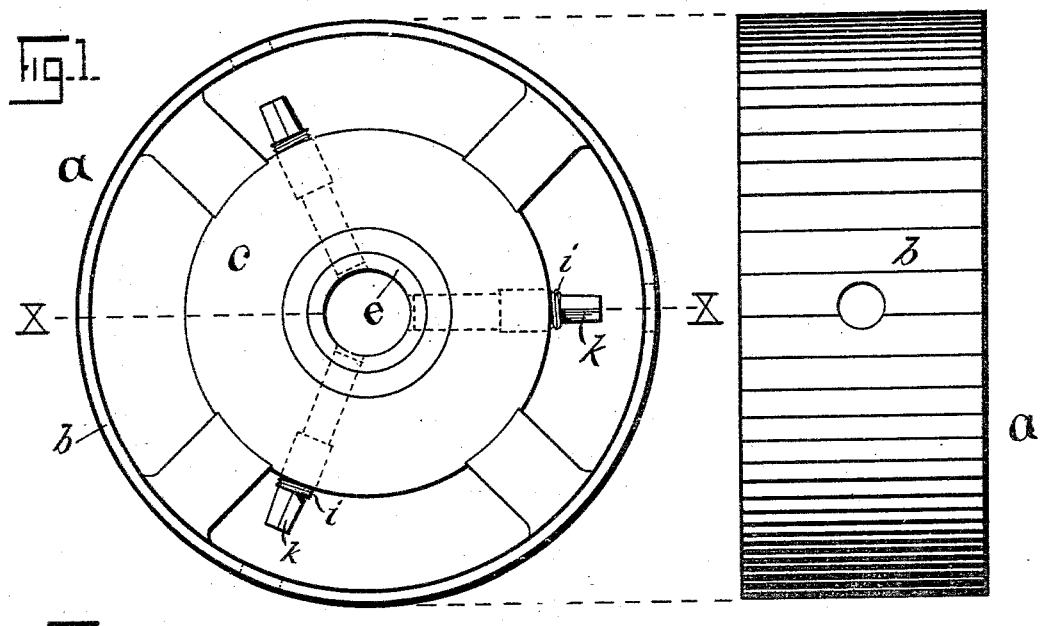
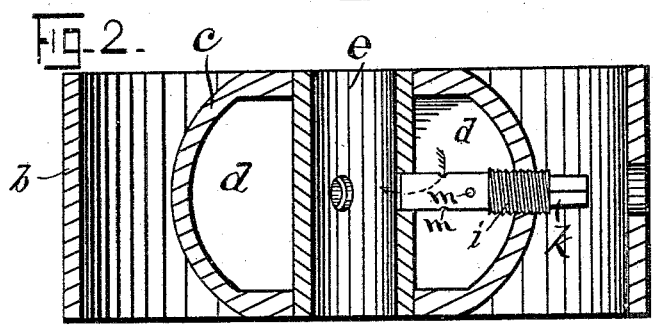
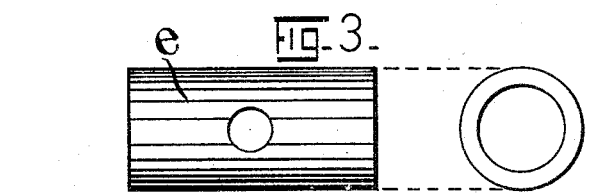
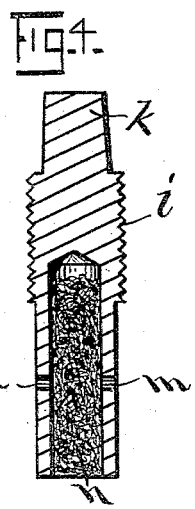
Witnesses
Alonzo M. Luther.
Allen Tenny.
Inventor
Daniel D. Tompkins.
By his Attorney
Frank H. Allen.

UNITED STATES PATENT OFFICE.

DANIEL D. TOMPKINS, OF ROCHESTER, NEW YORK, ASSIGNOR OF ONE-HALF TO C. B. ROGERS & CO., OF NORWICH, CONNECTICUT.

SELF-OILING PULLEY.

SPECIFICATION forming part of Letters Patent No. 425,272, dated April 8, 1890.

Application filed May 27, 1889. Serial No. 312,246. (No model.)

*To all whom it may concern:*

Be it known that I, DANIEL D. TOMPKINS, a citizen of the United States, residing at Rochester, in the county of Monroe and State of New York, have invented certain new and useful Improvements in Self-Oiling Pulleys, which improvements are fully set forth and described in the following specification, reference being had to the accompanying sheet of drawings.

This invention has particular relation to loose pulleys as commonly used in counter-shafts and various other mechanisms, and has for its immediate object the production of a pulley that shall be for a considerable time self-oiling, thus avoiding the necessity of daily attention. To this end I have produced a pulley so formed that an oil-reservior is provided, and also conduits or feeders connecting said reservoir and the shaft on which the pulley rotates.

To assist in explaining my said invention, I have provided the annexed drawings, in which—

Figure 1 illustrates end and face views of a pulley embodying my improvements. Fig. 2 is a cross-section of said pulley on line $x$ $x$ of Fig. 1. Fig. 3 shows side and end views of the bushing or shell $e$, and Fig. 4 is an enlarged view of one of the screw-plugs $i$, that form the conduits for the passage of oil to the central shaft.

Referring to these drawings, the letter $a$ indicates a cast-metal pulley formed with the usual rim $b$ to receive a belt, but having its hub $c$ of increased diameter and formed as a thin shell, thus providing a chamber or cavity $d$ that is open to the center of the pulley. Within the central hole of said pulley is a snug-fitting tubular bushing $e$, that is bored throughout its length to fit loosely on the shaft. This bushing, when in place in the pulley, forms the inner wall of the chamber $d$, in which the oil or other lubricating compound is to be stored.

In order to allow said lubricant to pass from said reservoir to the axial shaft of the pulley, I have provided one or more screw-plugs, which I will proceed to describe. When the bushing $e$ has been fitted in place in the pulley, I bore from the rim $b$ inward, passing through the wall of chamber $d$ and through the said bushing. The hole in the wall of chamber $d$ is then tapped out to receive a screw-plug $i$, as will be understood by reference to Fig. 2 of the drawings. The outer end of said plug is either slotted to receive a screw-driver or squared, as at $k$, to receive a wrench. Said plug is bored centrally from its inner end and is turned down to fit the hole in the bushing $e$, thus serving as a dowel to prevent the accidental displacement of said bushing. One or more radial openings $m$ lead outward from the central hole in said plug and provide a means of communication between the chamber $d$ and said central hole. It will now be understood that if the chamber $d$ be filled or partially filled with oil said oil will gradually find its way through the openings $m$ into the central hole of the plug $i$, and thence to the shaft on which the complete pulley rotates. To prevent the too rapid discharge of the oil, I prefer to pack the central hole in the screw-plug with wicking, wool, cotton, sponge, or similar material $n$, which soon becomes saturated with the lubricant. As the oil passes to the shaft from the open end of the plug the oil in chamber $d$ is drawn by capillary attraction through the openings $m$, and the packing is thus kept saturated until said oil is entirely withdrawn from the reservoir.

I have here shown three of the screw-plugs $i$, but do not wish to confine myself to any particular number.

My described improvements do not add materially to the cost of the pulley to which they are applied, yet they effectually accomplish the desired result.

While I have described my improvement as applied to "pulleys," the same plan of self-oiling could advantageously be used with vehicle or other wheels that revolve loosely on an axial shaft.

I claim as new and desire to secure by Letters Patent—

1. A pulley having its hub chambered, as set forth, in combination with a central tubular bushing fitted therein and conduits connecting said chamber and bushing, said conduits consisting of screw-plugs tapped into the outer wall of the hub-chamber extending through the oil-reservoir and into said bushing, all substantially as and for the objects specified.

2. In combination with a pulley having its hub chambered, as set forth, a tubular bushing fitted therein and a plug screwed in the outer wall of said hub extending as a dowel into said bushing, said plug being bored throughout a portion of its length and packed with wicking or similar material, as set forth, and provided with radial openings $m$, all substantially as and for the purpose specified.

DANIEL D. TOMPKINS.

Witnesses:
ROBT. W. PERKINS,
FRANK H. ALLEN.